US 6,670,733 B2

(12) United States Patent
Melfi

(10) Patent No.: US 6,670,733 B2
(45) Date of Patent: Dec. 30, 2003

(54) SYSTEM AND METHOD OF REDUCING BEARING VOLTAGE

(75) Inventor: Michael J. Melfi, Euclid, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 2 days.

(21) Appl. No.: 09/965,312

(22) Filed: Sep. 27, 2001

(65) Prior Publication Data

US 2003/0057783 A1 Mar. 27, 2003

(51) Int. Cl.$^7$ .............................................. H02K 11/00
(52) U.S. Cl. ...................... 310/68 R; 310/72; 310/90; 384/627; 361/212
(58) Field of Search ................................ 384/624, 627; 340/682; 361/1, 23, 212, 221; 310/68 R, 72, 219, 220, 221, 222, 90

(56) References Cited

U.S. PATENT DOCUMENTS

| | | | | |
|---|---|---|---|---|
| 3,176,286 A | * | 3/1965 | Dschen ........................ 340/682 |
| 3,997,805 A | * | 12/1976 | Dochterman ................. 310/90 |
| 4,267,461 A | * | 5/1981 | Grassmann ................. 307/105 |
| 4,511,837 A | * | 4/1985 | Vermeiren et al. .......... 324/671 |
| 4,535,377 A | * | 8/1985 | Lane ............... 361/1 |
| 4,641,978 A | * | 2/1987 | Kapich ........................ 384/102 |
| 4,831,295 A | * | 5/1989 | Posedel ........................ 310/72 |
| 4,932,795 A | * | 6/1990 | Guinn ........................ 384/276 |
| 5,804,903 A | * | 9/1998 | Fisher et al. ................. 310/248 |
| 5,821,652 A | * | 10/1998 | Hyypio ........................ 310/83 |
| 5,914,547 A | * | 6/1999 | Barahia et al. ................ 310/71 |
| 6,091,173 A | * | 7/2000 | Byrd ............................ 310/85 |
| 6,474,941 B2 | * | 11/2002 | Dingwell et al. ........... 415/162 |

FOREIGN PATENT DOCUMENTS

JP         2000-152564        * 5/2000        ........... H02K/11/00

OTHER PUBLICATIONS

Jay Erdman et al., "Effect of PWM Inverters on AC Motor Bearing Currents and Shaft Voltages", IEEE APEC Conference, Dallas, TX Mar., 1995.

Doyle Busse et al., "Bearing Currents and Their Relationship to PWM Drives", IEEE, Transactions on Power Electronics, vol. 12, No. 2, Mar. 1997, pp. 243–252.

Doyle F. Busse, et al., "The Effects of PWM Voltage Source Inverters on the Mechanical Performance of Rolling Bearings", IEEE, Transactions on Industry Applications, vol. 33, No. 2, Mar./Apr. 1997, pp. 567–576.

Doyle F. Busse, et al., "An Evaluation of the Electrostatic Shielded Induction Motor: A Solution for Rotor Shaft Voltage Buildup and Bearing Current", IEEE, Transactions on Industry Applications, vol. 33, No. 6, Nov./Dec. 1997, pp. 1563–1570.

* cited by examiner

Primary Examiner—Burton Mullins
(74) Attorney, Agent, or Firm—Ralph A. Graham; Alexander M. Gerasimow; William R. Walbrun

(57) ABSTRACT

Technique for reducing bearing current discharges in a system by increasing the surface area between the shaft and the frame of the system and thereby increasing the rotor to frame capacitance.

25 Claims, 3 Drawing Sheets

SYSTEM AND METHOD OF REDUCING BEARING VOLTAGE

BACKGROUND OF THE INVENTION

1. Field of the Invention

The present invention relates generally to an electromechanical system, such as an electric motor driven by an inverter, and a method for constructing and using the system. The system of the invention is designed to minimize rotor voltage and to thereby minimize bearing voltage and bearing current discharges.

2. Description of the Related Art

Virtually all rotating motors, generators, etc. to some degree develop either rotor shaft to ground voltage ($V_{rg}$), or shaft end-to-end voltage and resulting bearing currents ($I_b$). Shaft end-to-end voltage is typically the result of internal electromagnetic induction effects. External sources are a primary cause of $V_{rg}$ via electrostatic coupling. Modem voltage source inverters, such as pulse width modulation (PWM) inverters, are among those external sources which may be electrostatically coupled and thereby serve as sources of $V_{rg}$. The resulting $V_{rg}$ gives rise to electrostatically induced $I_b$, which is a growing industry concern since such currents ultimately result in mechanical damage to the bearing.

In a typical electrostatic coupling situation involving an external source, the rotor shaft voltage buildup occurs when the bearing assembly, comprising the rolling elements, the lubricant, and the bearing races, forms a capacitor (hereinafter a bearing capacitor), thereby providing a charging mechanism for the rotor shaft. The bearing capacitor forms as the rolling elements ride the dielectric lubricant around the races and become separated from the races by this dielectric film. Once the bearing capacitor forms, the external source can capacitively charge the rotor shaft to a voltage in excess of the lubricant's electric field breakdown intensity. This ultimately leads to an arcing discharge of current across the bearing, pitting the bearing and increasing mechanical wear.

Typically these bearing current events take the form of arcing discharge current pulses commonly referred to as Electric Discharge Machining (EDM) which occur due to capacitive discharge breakdowns in high-resistivity grease. These EDM events can occur when the bearing capacitor voltage, charged by the rotor shaft voltage, becomes high enough to break down the lubricant and a high current discharge flows through the charged oil film capacitor. This occurs when race-to-bearing asperity contacts come close, thereby increasing the oil film electric field and leading to breakdown and resulting high discharge currents. These currents in turn create localized elevated temperatures of the races and can lead to molten pits and fluting of the outer race which in turn can lead to bearing surface damage and, ultimately, bearing failure. Specifically, EDM events can occur when $V_{rg}$ exceeds a critical bearing threshold voltage ($V_{th}$), breaking down the insulating layer of lubricant. These problems are often exacerbated in those cases where PWM inverters are present because PWM inverters can produce higher EDM currents than those observed during sine wave operation due to their application of high common mode voltage and thereby high $V_{rg}$.

In designing to minimize the incidence of EDM events, the magnitude of the bearing voltage can be modeled as a capacitor divider circuit with the divider ratio equal to a Bearing Voltage Ratio (BVR). The BVR can be used to evaluate the potential for shaft voltages and bearing currents and to design accordingly. The BVR is equal to $V_{rg}/V_{cm}$ where $V_{cm}$ is equal to the stator common mode voltage. Alternately, BVR can be calculated as $C_{sr}/(C_{sr}+C_b+C_{rf})$ where $C_{sr}$ equals stator to rotor capacitance, $C_b$ equals bearing capacitance, and $C_{rf}$ equals rotor to frame (rotor to ground) capacitance.

Of the solutions which have been attempted to either minimize $V_{rg}$ or to reduce EDM, none have been completely successful. One such solution involves attaching a shaft grounding brush to the rotor shaft to bleed off $V_{rg}$ by creating a short circuit in the system. This approach, however, requires a low resistance contact between the brush and the rotor. In practice such a contact is difficult to maintain due to brush wear, contamination, and surface oxidation.

Another solution to $V_{rg}$ buildup and the resulting bearing currents is to use conductive grease as opposed to conventional lubricants. The conductive grease is formed by suspending metallic particles in the grease. Experience with conductive grease however indicates that such greases decrease bearing life dramatically.

Another solution to reducing $V_{rg}$ buildup has been to apply an insulating layer to the rotor shaft or bearing surfaces forming an additional capacitance in series with $C_b$. However, this approach has raised thermal problems as rotor heat must now traverse this additional insulating layer before reaching the frame.

Yet another approach has been to use an electrostatic, or Faraday, shield inserted between a radiating source and a shielded area to diminish $C_{sr}$, thereby reducing the coupling between the stator and the rotor. Use of such a shield is logistically difficult however because it must be inserted into the airgap of a motor without short circuiting the stator laminations, degrading the stator insulation system, or bridging the airgap across its entire length.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a system for reducing common mode voltage on the rotor shaft of a motor. The system comprises at least a rotor suspended within a frame by a plurality of bearings and a mechanism by which the capacitance between the rotor and the frame is increased, e.g. by increasing the surface area presented between the rotor shaft and the grounded surfaces. The increase in rotor to frame capacitance serves to reduce the voltage on the rotor shaft and thereby to minimize the incidence of harmful bearing current discharges. Dielectric materials disposed adjacent to the surface area enhancement may be used to further increase the rotor to frame capacitance. Ionization of the dielectric material may be done to create a continuous path for current, allowing the shaft to ground voltage to be reduced to near zero.

In accordance with another aspect of the present invention, there is provided a method for reducing detrimental bearing current discharges. The method comprises increasing rotor to frame capacitance by increasing the surface area presented between the rotor shaft and frame of an electromechanical device. The increase in rotor to ground capacitance acts to reduce rotor to frame voltage and to thereby minimize the incidence of bearing current discharges.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Generally, the present invention relates to reducing the occurrence of $V_{rg}$ buildup and the resulting EDM events by increasing the $C_{rf}$ term of the BVR, thereby increasing the denominator of the ratio. This increase in the $C_{rf}$ term is accomplished, for example, by effectively increasing the surface area closely presented between the rotating assembly and the adjacent grounded surfaces. In this manner shaft surface area inside a motor or other device may be utilized to increase the capacitive surface area by as much as an order of magnitude or more and to thereby decrease the scale of the common mode voltage associated with $V_{rg}$ in an inverter driven system. By increasing $C_{rf}$ in this way bearing voltage may be reduced to a non-damaging level.

Further, the gaps created between the rotating assembly and adjacent grounded surfaces may be completely or partially filled with a dielectric material to further increase $C_{rf}$. In addition, this dielectric material may be ionized by the shaft or bearing voltage of the system, thereby providing a continuous path for current flow and keeping this voltage near zero instead of simply scaling it down. In this manner, a mechanism behaving like a shaft grounding brush may be created without the physical liabilities of a grounding brush.

Figure 1:
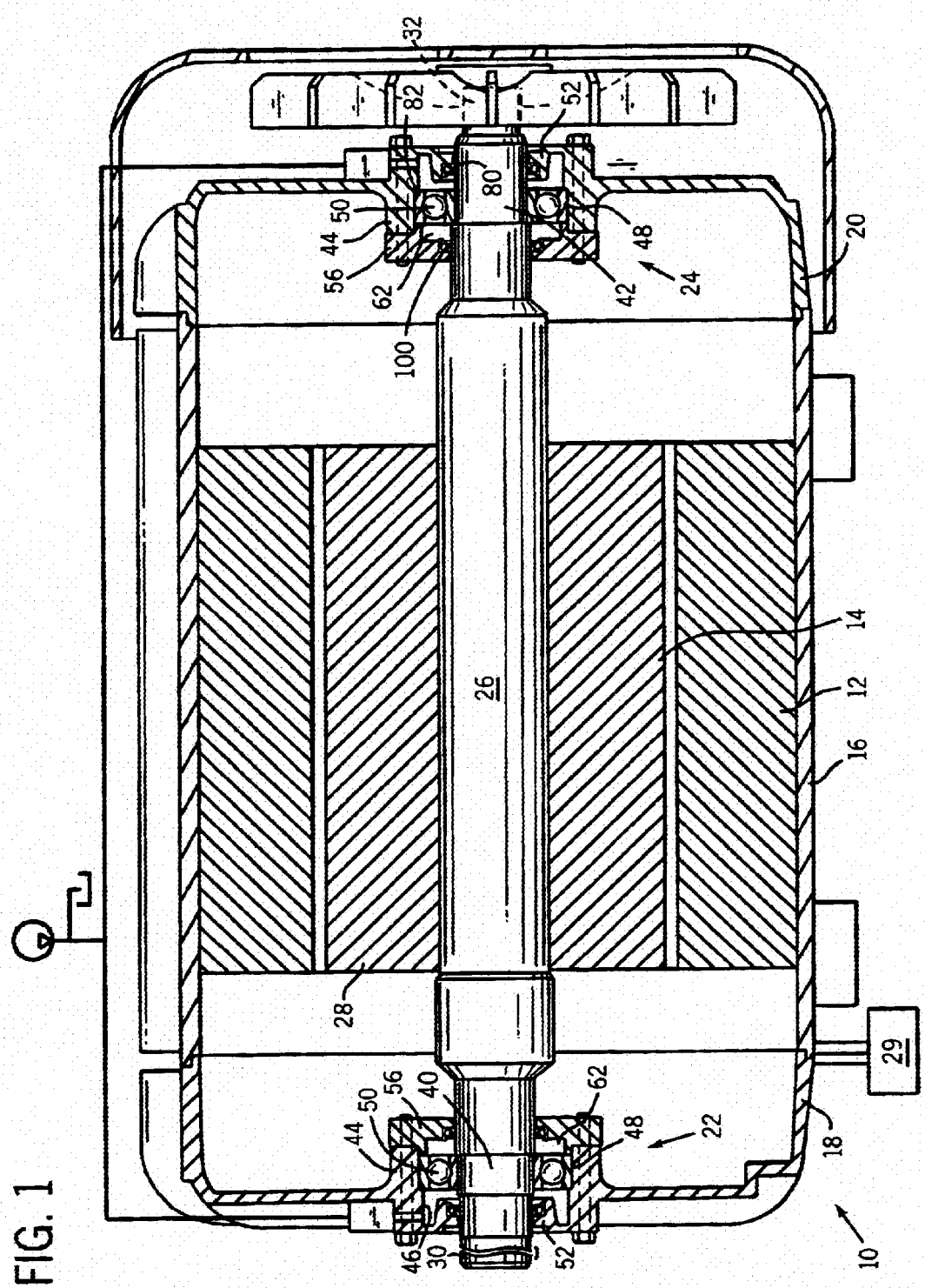
FIG. 1 is a diagrammatical sectional view of an exemplary electric motor having a pair of rotor support bearing assemblies.

Turning now to the drawings, and referring first to FIG. 1, a diagrammatical sectional view of an electromechanical device, e.g. an electric motor, is illustrated as having a pair of rotor support bearing assemblies according to one exemplary embodiment of the present invention. The electric motor, designated generally by the reference number 10, includes a stator assembly 12 in which a rotor assembly 14 is rotatably positioned. Stator assembly 12 is lodged within a frame or central housing section 16 of the electric motor in accordance with known techniques. Housing 16 is bounded by a drive end bracket 18 and a non-drive end bracket 20. As will be appreciated by those skilled in the art, drive and non-drive end brackets 18 and 20 provide support for a drive end bearing assembly 22, and a non-drive end bearing assembly 24, respectively. Assemblies 22 and 24 will be described in greater detail below.

The exemplary motor 10 is a variable speed motor coupled to an inverter 30 such as a pulse width modulation inverter. Inverter 30 is typically a source of a common mode voltage to the system. As will be appreciated by those skilled in the art, stator assembly 12 includes stator windings disposed in a stator core and configured to receive input power from a source to drive rotor assembly 14 in rotation. Rotor assembly 14 includes a rotor shaft 26 on which a rotor 28 is fixed. A drive or output end 30 of shaft 26 extends through the drive end bracket 18, while a non-drive end or fan support end 32 of shaft 26 extends through non-drive end bracket 20.

It should be noted that the techniques of minimizing bearing current discharges described herein are not limited to any particular form of electric motor or to motors at all. Other electromechanical devices, such as generators, might also benefit from these techniques. Any device comprising a shaft supported by a bearing assembly in a frame and where the shaft acquires a voltage may benefit from the described techniques.

Bearing assemblies 22 and 24 are provided at a pair of support regions 40 and 42, respectively, of shaft 26 to support the shaft in rotation. To accommodate assemblies 22 and 24, drive end and non-drive end brackets 18 and 20 each include an integrally formed support extension 44. In FIG. 1, support extensions 44 are annular structures extending inwardly and forming central bores. 46. Within bores 46, each support extension 44 forms a bearing support surface 48 for receiving an antifriction bearing set 50 comprising a plurality of bearings. Outboard of bearing support 48, each support extension 44 includes an annular outboard seal support 52. Supports 52 have central apertures coaxial with bores 46, permitting an end of shaft 26 to extend therethrough.

Support extension 44 is also formed to accommodate an inboard sealing arrangement. In particular, an annular internal cap 56 is positioned adjacent to an inboard face of each support extension 44. Internal caps 56 surround portions of shaft 26 and define a hole through which shaft 26 freely extends. Support extension 44, internal cap 56, outboard seal support 52 and shaft 26 define bearing cavities 62. Each bearing cavity 62 includes an annular space or region surrounding shaft 26 in which a bearing set 50 is positioned.

Figure 2:
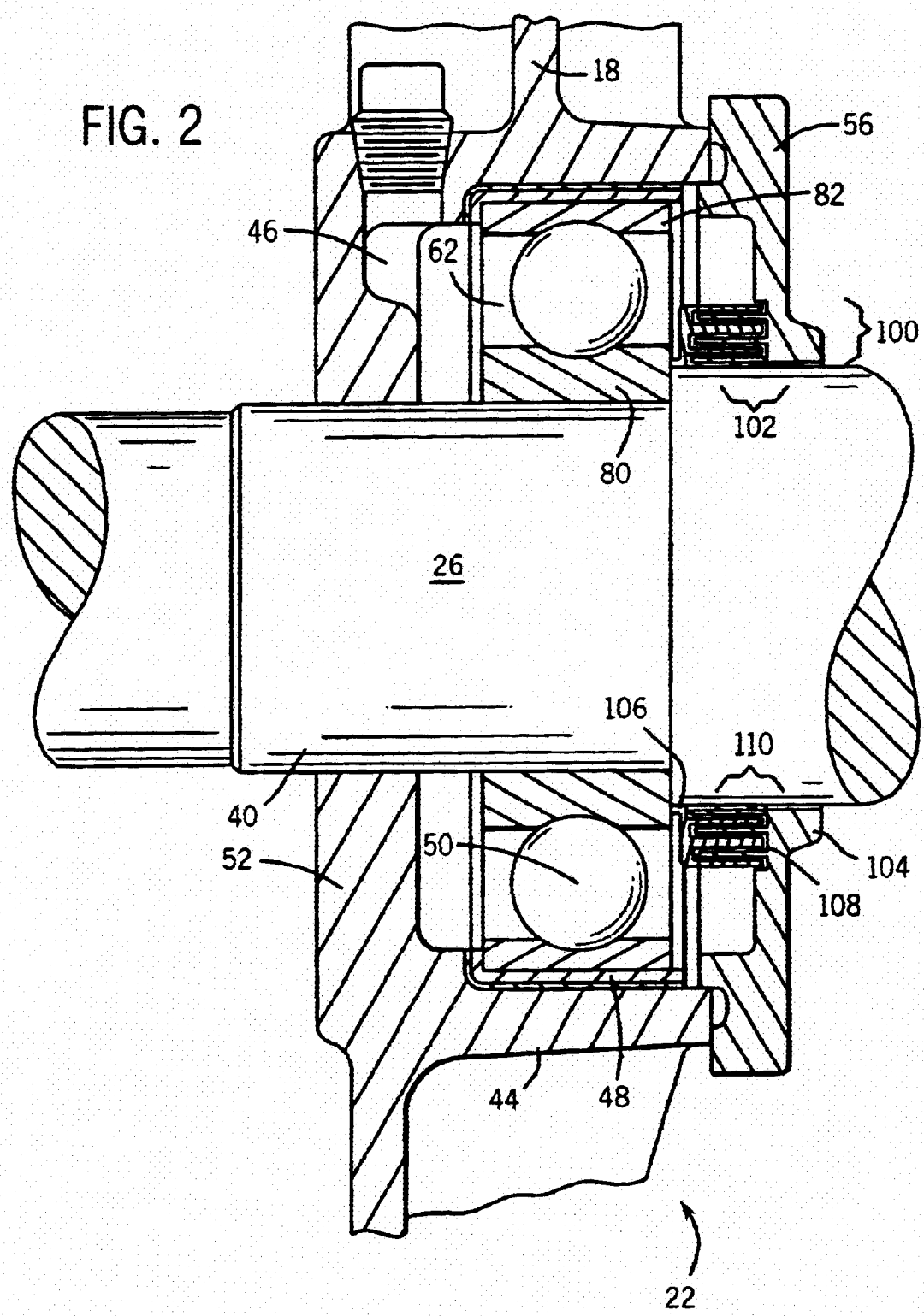
FIG. 2 is an enlarged partial cross-sectional view of one of the bearing assemblies illustrated in FIG. 1.

Referring now to FIG. 2, the mounting arrangement of drive-end bearing assembly 22 is shown in greater detail. It can be seen in FIG. 1 that non-drive end bearing assembly 24 is similarly mounted. Bearing assembly 22 comprises an inner ring member 80 in contact with and rotating with shaft 26. Inner ring member 80 defines a raceway on its outer circumferential surface. An outer ring member 82 defines an outer raceway on its inner circumferential surface. The respective raceways of inner ring member 80 and outer ring member 82 are radially opposed to define a space in which the plurality of bearing rolling elements comprising bearing set 50 are received. Typically the bearing rolling elements of bearing set 50 are constructed as balls or rollers.

In the illustrated embodiment, internal cap 56 and shaft 26 have been modified to cooperatively form a capacitive enhancement 100 in the area of adjacency between inner cap 56 and shaft 26. In the illustrated embodiment, capacitive enhancement 100 comprises a rotating labyrinth 102. Labyrinth 102 in turn is comprised of grounded member 104, shaft-voltage reducer 106, and one or more gaps 108 formed between grounded member 104 and shaft-voltage reducer 106 where they cooperatively interact.

In this embodiment, grounded member 104 is integrated as a portion of internal cap 56 and is ultimately grounded by housing 16. Shaft-voltage reducer 106 is mounted on shaft 26. Shaft-voltage reducer 106 together with adjacent grounded member 104 constitute a pair of enhanced surfaces which form a rotating assembly whose interleaving creates an enhanced surface area 110. Enhanced surface area 110 serves to increase the rotor to frame capacitive surface area ($C_{rf}$) of the BVR, increasing the denominator of the ratio and reducing voltage between the rotor shaft and ground by this scaling factor. This reduction in voltage ultimately results in a reduction of the incidence and magnitude of harmful bearing current discharges.

Figure 3:
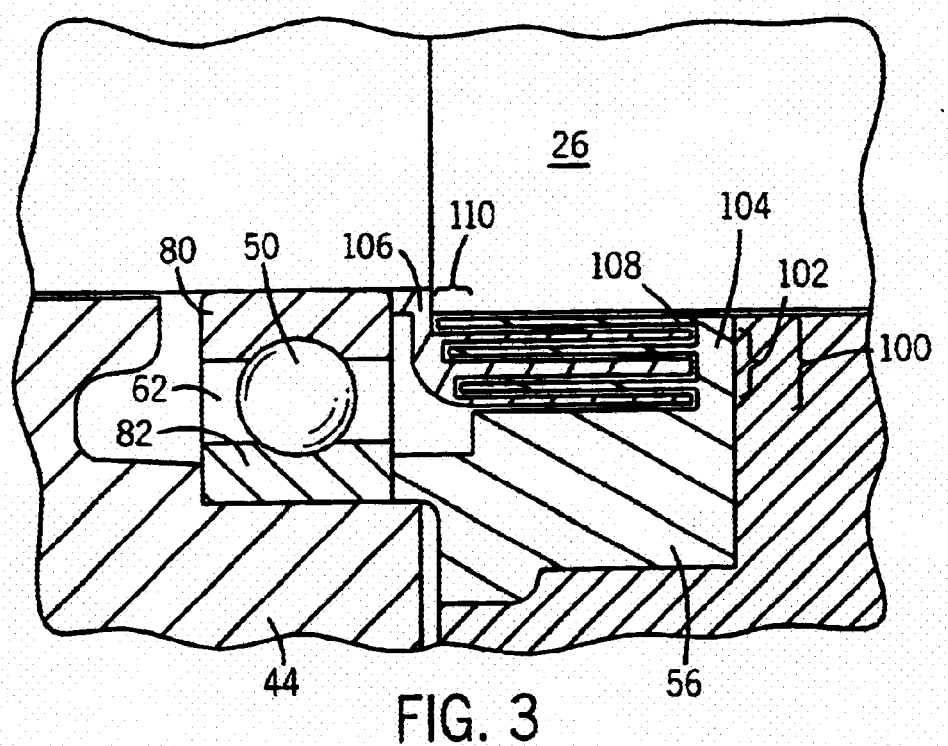
FIG. 3 is an enlarged partial cross-sectional view of an embodiment of the present invention illustrating a bearing assembly with a surface area enhancement.

Referring now to FIG. 3, the embodiment of FIG. 2, particularly capacitive enhancement 100, is shown in greater detail. As illustrated in this embodiment, internal cap 56 and shaft 26 are modified by a capacitance enhancement 100. In this embodiment, an enhanced surface area 110 is formed by a rotating labyrinth 102 defining the one or more gaps 108 which serve to increase the effective surface area between the grounded housing 16 and the shaft 26.

It should be noted however that the illustrated embodiment is only one of many possible embodiments covered by this invention. Other possible embodiments include, but are not limited to, the use of rods both in the rotating or fixed portion of capacitive enhancement 100 such that the interleaving rods define enhanced surface area 110. Additionally, labyrinth 102 as defined by grounded member 104 and shaft-voltage reducer 106 may be oriented perpendicular to the axis defined by shaft 26 as opposed to generally parallel to shaft 26. This may be accomplished by attaching ring like structures to the shaft to form shaft-voltage reducer 106 and interleaving these ring structures with cooperatively formed structures forming grounded member 104 integrated into internal cap 56.

The invention also is not limited to embodiments where grounded member 104 is formed integral to internal cap 56. Both grounded member 104, and the resulting capacitive enhancement 100, may be formed independent of internal cap 56 as long as some attachment to a grounded surface, typically housing 16, is maintained. While a preferred embodiment is to form grounded member 104 as the portion of internal cap 56 adjacent to shaft 26, grounded member 104 may, alternatively, be formed as an attachment to an unmodified internal cap 56 or independent of internal cap 56 as long as some means of grounding member 104 is maintained.

Figure 4:
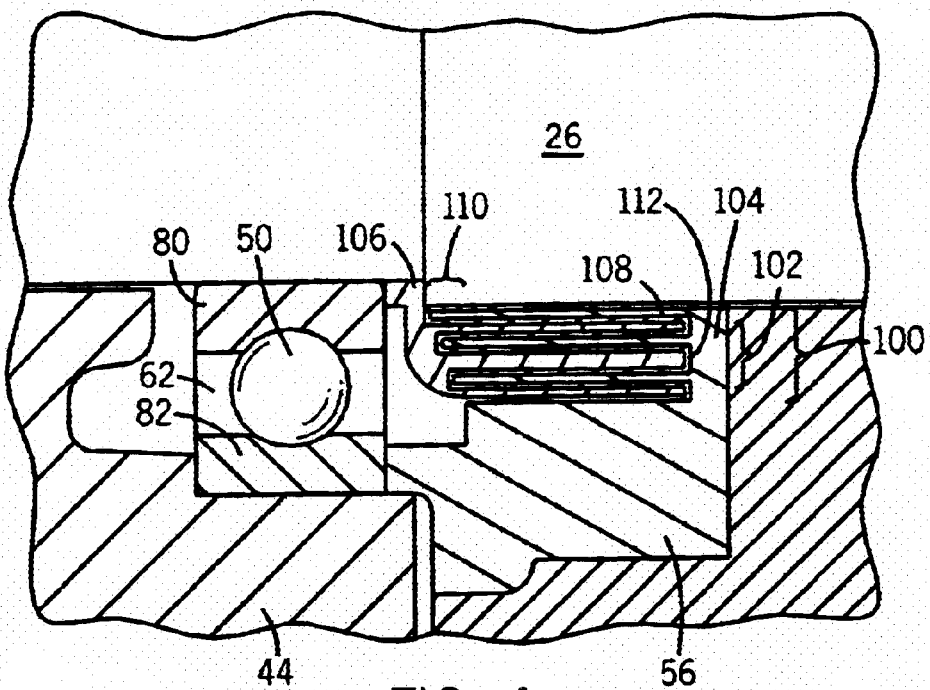
FIG. 4 is an enlarged partial cross-sectional view of an alternative bearing assembly with a surface area enhancement containing additional dielectric material.

In FIG. 4, an alternative embodiment of the present invention is illustrated. In this embodiment, capacitive enhancement 100 is again shown comprising rotating labyrinth 102 for illustrative purposes. In this embodiment the one or more gaps 108 defined by the cooperative engagement of grounded member 104 and shaft-voltage reducer 106 are completely or partially filled with a dielectric material 112 to further increase the rotor to frame capacitance of the system. The dielectric material may be combined with or formulated as the lubricant or grease already present in bearing cavity 62, however a different dielectric substance may be used to fill the one or more gaps 108 specifically for the purpose of increasing rotor to frame capacitance. It should be noted that the addition of dielectric material 112 to capacitive enhancement 100 is not limited to the embodiment illustrated. In particular, other embodiments, such as the rotating rings or rotating rods previously mentioned, may also benefit from the addition of dielectric material 112 to the extent that the alternative embodiments define one or more gaps 108 to which dielectric material 112 may be added.

In a preferred embodiment based upon that illustrated in FIG. 4, dielectric material 112 is ionized to form a continuous path for current flow. This ionization may be accomplished by the shaft or bearing voltage already present. The embodiment allows for the reduction of shaft and bearing voltage to near zero, as opposed to simple reduction by a scaling factor. By forming this continuous path for current flow, a virtual shaft grounding brush is formed which allows this reduction to near zero voltage. Unlike a traditional shaft grounding brush however, there are none of the concerns about maintaining a low resistance contact between the brush and the rotor.

While the invention is susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the appended claims.

What is claimed is:

1. A bearing system comprising:
    a frame;
    a shaft;
    a rotor assembly mounted on the shaft;
    at least one bearing supporting the shaft in the frame; and
    a capacitance enhancement mechanism by which rotor to frame capacitance is increased, wherein the capacitance enhancement mechanism comprises a labyrinth, the labyrinth comprising a ground member, a shaft-voltage reducer, and one or more gaps disposed between the ground member and the shaft-voltage reducer, wherein the one or more gaps are at least partially filled with dielectric material.

2. The bearing system, as recited in claim 1, wherein the dielectric material is ionized to create a continuous path for current flow.

3. The bearing system, as recited in claim 1, wherein the ground member is adjacent to the shaft and the shaft-voltage reducer is mounted on the shaft.

4. The bearing system, as recited in claim 1, wherein a common mode voltage on the shaft is reduced by a scaling factor determined by the capacitive enhancement mechanism.

5. An electromechanical device comprising:
    a housing coupled to a grounded member having an enhanced surface area;
    a shaft rotatably mounted to the housing; and
    a shaft-voltage reducer mounted for rotation with the shaft, the shaft-voltage reducer having a corresponding surface configured to extend along the enhanced surface area to reduce common mode voltage, wherein one or more gaps are created between the grounded member and the shaft-voltage reducer and at least partially filed with a dielectric material.

6. The electromechanical device, as recited in claim 5, wherein the grounded member and the shaft-voltage reducer comprise a labyrinth.

7. The electromechanical device, as recited in claim 5, further comprising a rotor, wherein the grounded member and the shaft-voltage reducer comprise a capacitive enhancement mechanism which increases rotor to frame capacitance.

8. The electromechanical device, as recited in claim 7, wherein the common mode voltage on the shaft is reduced by a scaling factor determined by the capacitance enhancement mechanism.

9. The electromechanical device, as recited in claim 8, wherein the reduction of the common mode voltage reduces the incidence of bearing current discharges to a harmless level.

10. A system for reducing common mode voltage comprising:
- a pulse width modulated inverter producing a common mode voltage; and
- a motor having:
  - a housing;
  - a stator assembly mounted to the housing;
  - a shaft;
  - a rotor assembly coupled to the shaft and rotatably mounted within the housing via at least one bearing;
  - a capacitive enhancement mechanism coupled between the housing and the rotor, the capacitive enhancement mechanism having a capacitor formed by a pair of enhanced surfaces that undergo relative movement, wherein the pair of enhanced surfaces are comprised of a grounded member and a shaft-voltage reducer and where one or more gaps are disposed between the grounded member and the shaft-voltage reducer; and
  - a dielectric lubricant disposed to circulate within the one or more gaps.

11. The system as recited in claim 10, wherein the grounded member is adjacent to the shaft and the shaft-voltage reducer is mounted on the shaft.

12. The system as recited in claim 10, wherein the dielectric lubricant is ionized to create a continuous path for current flow.

13. The system as recited in claim 10, wherein the common mode voltage on the shaft is reduced by a scaling factor determined by the capacitance enhancement mechanism.

14. The system as recited in claim 13, wherein the capacitance enhancement mechanism increases rotor to housing capacitance and where the scaling factor is a bearing voltage ratio where the denominator of the bearing voltage ratio increases as rotor to housing capacitance increases.

15. The system as recited in claim 13, wherein the reduction of common mode voltage on the shaft reduces the incidence of bearing current discharges.

16. A method of reducing detrimental bearing current discharges in a system having a rotor shaft rotatably mounted within a frame, comprising:
- presenting enhanced surface areas between the rotor shaft and the frame;
- adjusting the difference between the enhanced surface areas to increase rotor shaft to frame capacitance;
- grounding one of the enhanced surface areas to the frame;
- reducing rotor to ground voltage on the shaft during operation; and
- arranging one or more gaps between the enhanced surface areas and at least partially filling the gaps with a dielectric material.

17. The method as recited in claim 16, further comprising reducing bearing current discharges.

18. The method as recited in claim 16, further comprising forming the enhanced surface areas into a labyrinth.

19. The method as recited in claim 16, further comprising ionizing the dielectric material to create a continuous path for current flow.

20. A system for reducing voltage between elements of a rotating machine, the system comprising:
- a capacitive enhancement mechanism configured to be coupled between a machine housing and a machine rotor, the capacitive enhancement mechanism having a capacitor formed by a pair of enhanced surfaces that undergo relative movement during operation, wherein the enhancement surfaces each comprise a grounded member and a shaft-voltage reducer, and where one or more gaps are disposed between the grounded member and the shaft-voltage member; and
- a dielectric material disposed to circulate within the one or inure gaps.

21. The system, as recited in claim 20, wherein the dielectric material is ionized to create a continuous path for current flow.

22. The system, as recited in claim 20 wherein a common mode voltage is reduced by a scaling factor determined by the capacitive enhancement mechanism.

23. A system for reducing voltage between elements of a rotating machine, the system comprising:
- a housing;
- a stator assembly mounted within the housing;
- a shaft;
- a rotor assembly coupled to the shaft and rotatably mounted within the housing via at least one bearing;
- a capacitive enhancement mechanism coupled between the housing and the rotor, the capacitive enhancement mechanism having a capacitor formed by a pair of enhanced surfaces that undergo relative movement, wherein the enhancement surfaces each comprise a grounded member and a shaft-voltage reducer, and where one or more gaps are disposed between the grounded member and the shaft-voltage member; and
- a dielectric material disposed to circulate within the one or more gaps.

24. The system, as recited in claim 23, wherein the dielectric material is ionized to create a continuous path for current flow.

25. The system, as recited in claim 23, wherein a common mode voltage is reduced by a scaling factor determined by the capacitive enhancement mechanism.

* * * * *